United States Patent [19]
Hoenig

[11] Patent Number: 5,881,985
[45] Date of Patent: Mar. 16, 1999

[54] TILTING, SWIVELING, LOCKING BASE FOR MONITORS

[75] Inventor: David V. Hoenig, Los Gatos, Calif.

[73] Assignee: Apple Computer, Inc., Cupertino, Calif.

[21] Appl. No.: 794,858

[22] Filed: Feb. 4, 1997

[51] Int. Cl.⁶ .................................................. A47G 29/00
[52] U.S. Cl. ........................ 248/371; 248/918; 248/923
[58] Field of Search .................................. 248/371, 395, 248/397, 398, 919, 920, 921, 922, 923, 916

[56] References Cited

U.S. PATENT DOCUMENTS

| | | | |
|---|---|---|---|
| 4,365,779 | 12/1982 | Bates et al. | 248/371 |
| 4,589,713 | 5/1986 | Pfuhl et al. | 339/7 |
| 4,591,123 | 5/1986 | Bradshaw et al. | 248/349 |
| 4,645,153 | 2/1987 | Granzow et al. | 248/178 |
| 5,037,050 | 8/1991 | Lin et al. | 248/179 |
| 5,588,625 | 12/1996 | Beak | 248/371 |
| 5,603,478 | 2/1997 | Wang | 248/371 |
| 5,632,463 | 5/1997 | Sung et al. | 248/371 |

*Primary Examiner*—Ramon O. Ramirez
*Assistant Examiner*—Robert Lipscik
*Attorney, Agent, or Firm*—Carr & Ferrell LLP

[57] ABSTRACT

A tilting, swiveling, locking base apparatus tilts, swivels and locks to a computer monitor. The base apparatus comprises a tiltball unit including a slot opening which has a key opening portion, a recessed ledge disposed about the slot opening, and a locking rib disposed on the recessed ledge adjacent the key opening portion. The base apparatus further comprises a support unit having support points lying in a plane and including a shaft extending in a direction substantially perpendicular from the plane to an outer end, teeth on the outer end of the shaft configured to fit through the slot opening only in the key opening portion, a locking rim configured to slideably engage the recessed ledge, and an elastic locking snap formed to be deflected by the locking rib when the teeth are inserted into the key opening and to rebound when the shaft is displaced in the slot from the rib. The base apparatus uses a special tool to deflect the locking snap for detaching the tiltball unit from the support unit.

23 Claims, 12 Drawing Sheets

TILTING, SWIVELING, LOCKING BASE FOR MONITORS

BACKGROUND OF THE INVENTION

1. Field of the Invention

This invention relates generally to computer monitor housings, and more particularly to a base which tilts, swivels and locks a monitor housing.

2. Description of the Background Art

A typical computer monitor is mounted on a monitor base which allows both tilting (i.e., changing the vertical angle of the monitor with respect to the user's eye level) and swiveling (i.e., changing the horizontal angle of the monitor with respect to the user's position) capabilities. Typical monitor bases have an excessive number of parts which often makes them expensive to manufacture, difficult to assemble and fragile to handle (especially for large computer monitors).

Some conventional monitor bases are detachable from the monitor by any user easily without the use of any special tools. However, lay users sometimes detach such monitors from their bases unintentionally and can damage the base.

Other conventional monitor bases are permanently attached to computer monitors, and can only be detached by breaking the monitor base.

Therefore, a system and method are needed to provide a locking feature for a monitor base without compromising the tilting and swiveling capabilities. Further, a system and method are needed which use a special tool to detach the monitor base from the computer monitor.

SUMMARY OF THE INVENTION

The present invention provides a base apparatus for tilting, swiveling and locking to a computer monitor. A base apparatus comprises a tiltball unit including a slot opening which has a key opening portion, a recessed ledge disposed about the slot opening, and a locking rib disposed on the recessed ledge adjacent the key opening portion. The base apparatus further comprises a support unit having support points lying in a plane and including a shaft extending in a direction substantially perpendicular from the plane to an outer end, teeth on the outer end of the shaft configured to fit through the slot opening only in the key opening portion, a locking rim configured to slideably engage the recessed ledge, and an elastic locking snap formed to be deflected by the locking rib when the teeth are inserted into the key opening and to rebound when the shaft is displaced in the slot from the rib. The base apparatus uses a special tool to deflect the locking snap for detaching the tiltball unit from the support unit.

DETAILED DESCRIPTION OF THE PREFERRED EMBODIMENT

Figure 1:
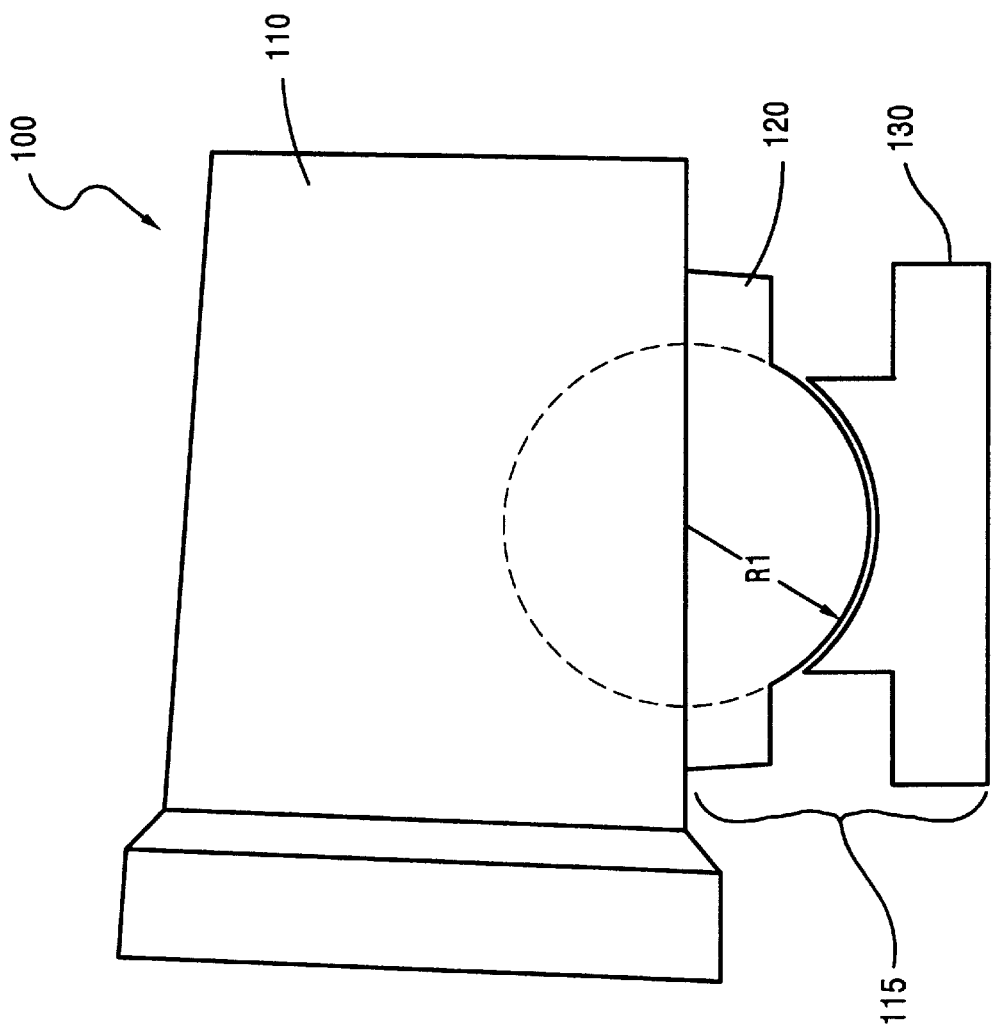
FIG. 1 is a side view of a computer monitor and base assembly according to the invention.

FIG. 1 is a side view of a computer monitor and base assembly 100 in accordance with the present invention. Assembly 100 comprises a computer monitor 110 seated upon a base 115, which includes a tiltball 120 fixedly coupled to monitor 110 and tiltably and swivelably coupled to a support 130. Tiltball 120 and support 130 are each single pieces of hardened plastic which may be formed using a conventional injection molding process. The relationship between tiltball 120 and support 130 enables a user to tilt monitor 110 up and down and to swivel or to pan it left and right. Tiltball 120 and support 130 have components (not visible in FIG. 1) for interlocking the two parts.

Figure 2:
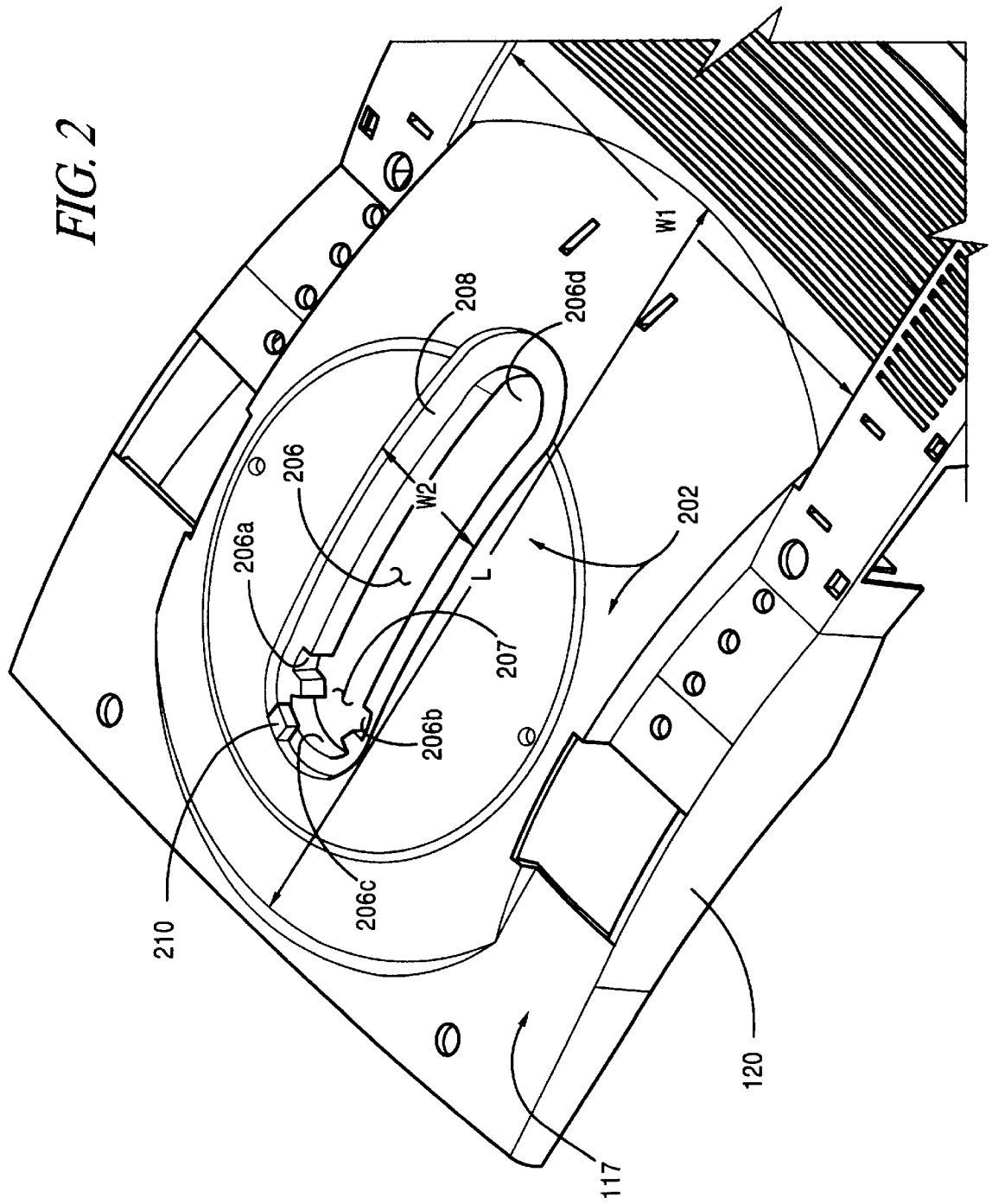
FIG. 2 is a perspective view of the underside of the tiltball unit of FIG. 1.

FIG. 2 is a perspective view of a bottom surface 117 of tiltball 120, which includes a substantially spherical surface section 202 having a recessed ledge 208 and, within recessed ledge 208, a slot opening 206. Spherical surface 202 is substantially convex, having a radius of curvature R1 (FIG. 1), a width W1 and a length L. Length L is preferably greater than width W1, and defines the "longitudinal" axis of tiltball 120. Recessed ledge 208 is preferably the same curvature as surface 202, oblong, about three times as long (L) as wide (W2), and disposed along the longitudinal centerline of tiltball 120. Recessed ledge 208 includes a locking rib 210, preferably about as high as recessed ledge 208 is deep, and having the same length radially towards opening 206 as the width of recessed ledge 208. The operation of locking rib 210 is described in greater detail with reference to FIGS. 6, 8 and 11.

Slot opening 206 is formed within recessed ledge 208 and is preferably substantially oblong. Slot opening 206 includes a wing 206a, a wing 206b, a crown 206c and a tail 206d. Wings 206a and 206b are preferably square notches in recessed ledge 208 opposite each other. Crown 206c is preferably an arcuate notch in recessed ledge 208 between wing 206a and wing 206b and adjacent locking rib 210. The wing 206a, wing 206b and crown 206c is referred to as "key opening" 207. Although key opening 207 is described as having specific features, other features can be used instead.

Figure 3:
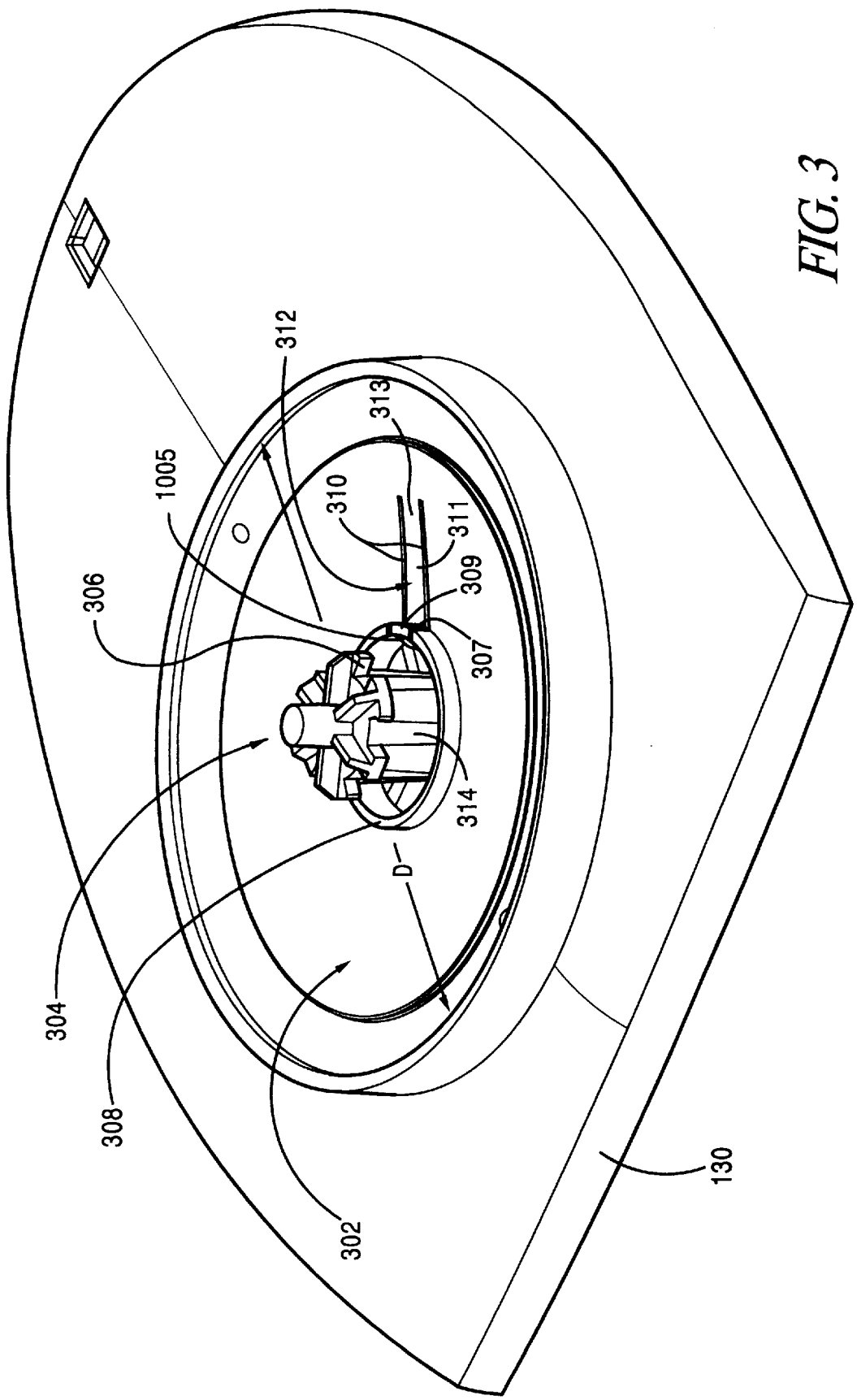
FIG. 3 is a perspective view of the support of FIG. 1.

FIG. 3 is a perspective view of support 130, which includes substantially spherical surface section 302, keyed post 304 and locking rim 308. Spherical surface 302 is preferably concave, having a radius of curvature substantially equal to the radius of curvature R1 of convex surface 202. Thus, when tiltball 120 is engaged with support 130, all of spherical surface 302 contacts spherical surface 202 (FIG. 2). The diameter D of spherical surface 302 may be smaller than width W1 of spherical surface 202, so that spherical surface 202 can effectively slide on spherical surface 302. Locking rim 308 is preferably a substantially continuous, circular, raised wall formed about a preferably central portion of spherical surface 302. Locking rim 308 comprises a locking rim opening 307. The height of locking rim 308 is no greater than the depth of recessed ledge 208, and the outside diameter of rim 308 is no greater than the outer width W2 of ledge 208. The spherical surface 302 comprises a base opening 313 defined by two parallel slits 310 and a locking snap 312 lodged therewith. The locking snap 312 is structurally defined by a deflectable tab portion 311, a rim stop 309 connected to the deflectable tab portion 311, and an overhanging lip 1005 extending from the deflectable tab portion 311. Thus, when engaging tiltball 120 with support 130, locking rib 210 operatively engages locking snap 312 as will be described in greater detail with reference to FIGS. 6, 8 and 11.

Keyed post 304 includes a shaft 314 and features 306 at the top end of shaft 314. Shaft 314 is disposed centrally within locking rim 308, extends radially upward from spherical surface 302 and is long enough for features 306 to pass through key opening 207 and engage ledge 410 (FIG. 4) on the topside of tiltball 120. Features 306 are designed to complement the wing and crown openings in key opening 207. Details and operation of shaft 314 and features 306 are described in greater detail with reference to FIGS. 4 and 5.

Figure 4:
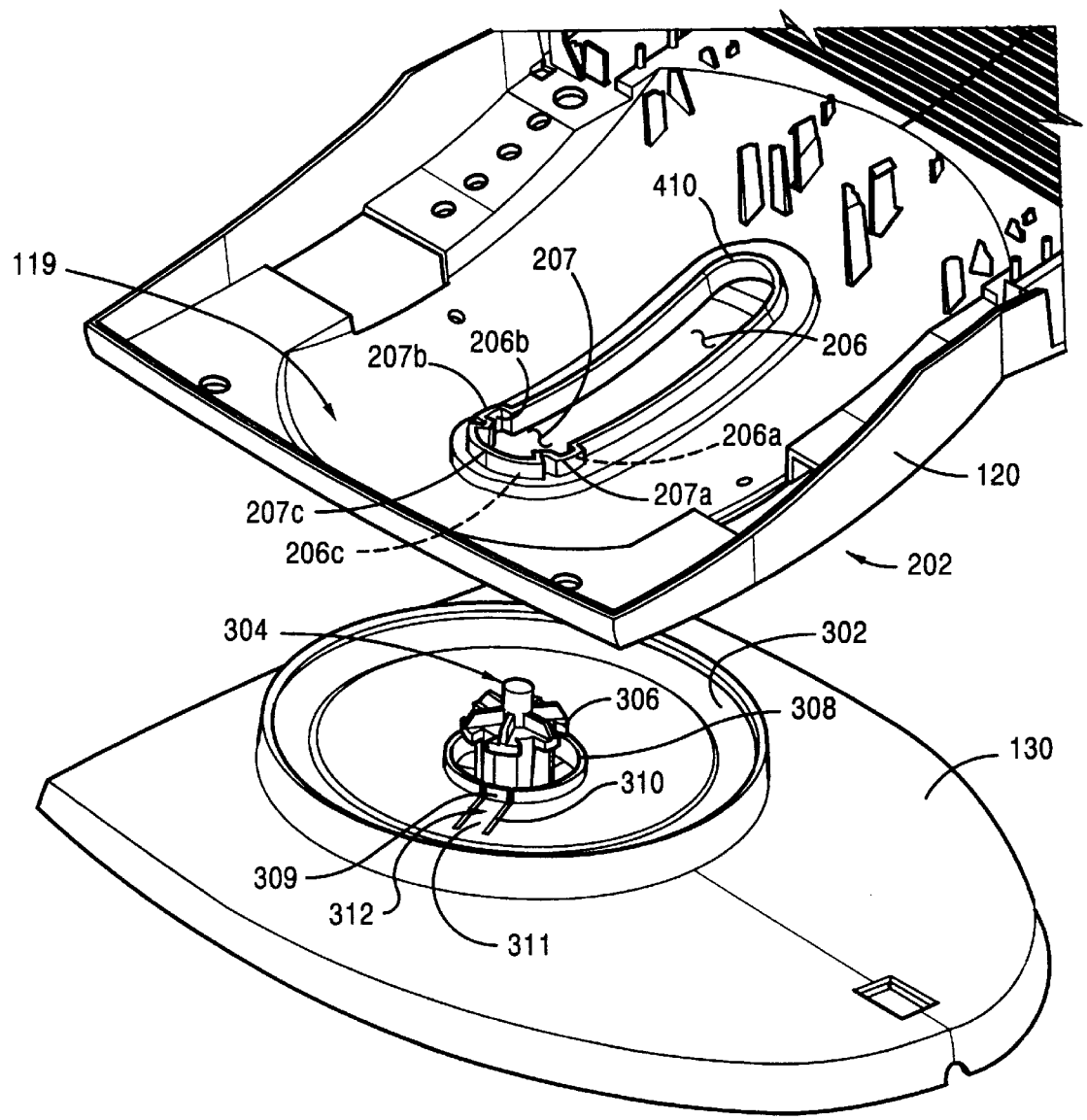
FIG. 4 is a perspective view illustrating the top side of the tiltball unit of FIG. 2 disengaged from and aligned with the support of FIG. 3.
Figure 5:
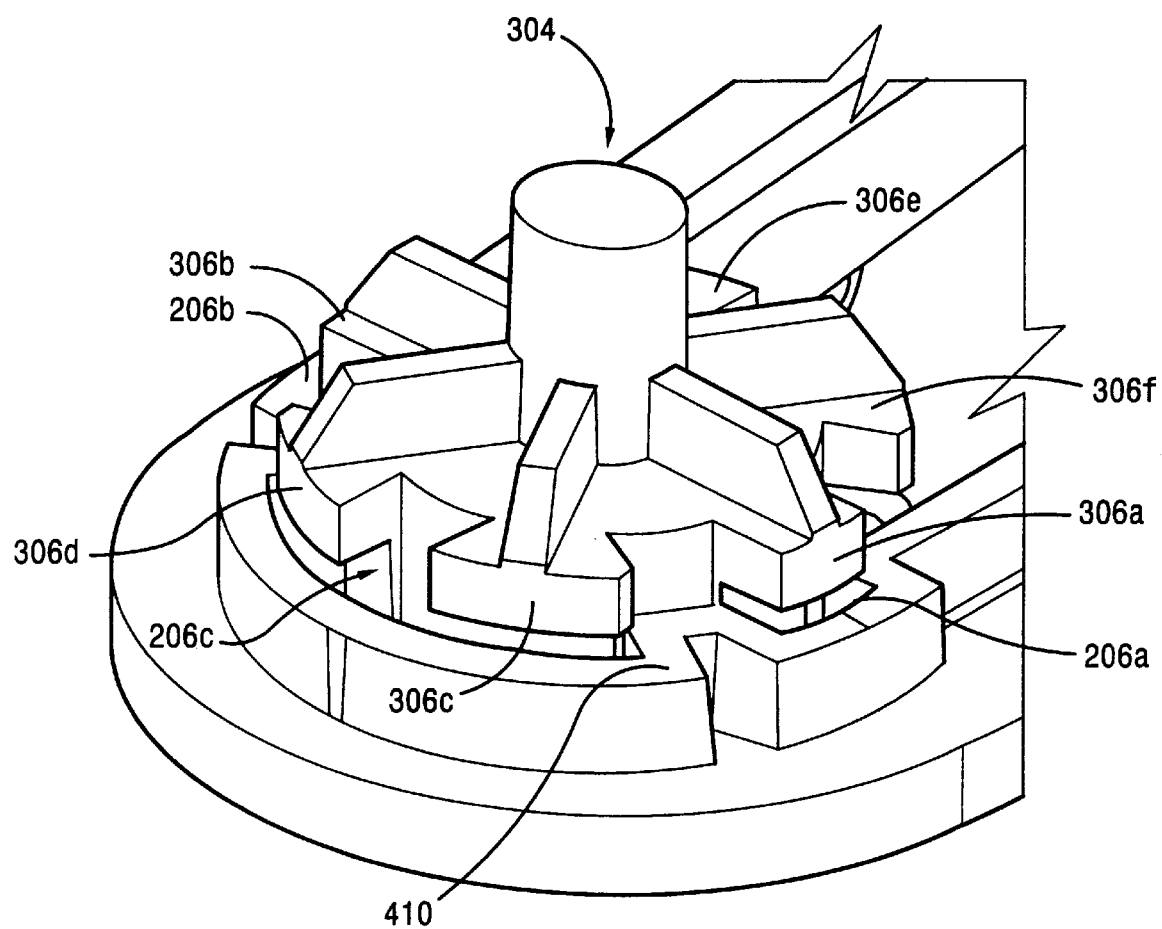
FIG. 5 is a perspective view illustrating details of the keyed post of FIG. 3.
Figure 9:
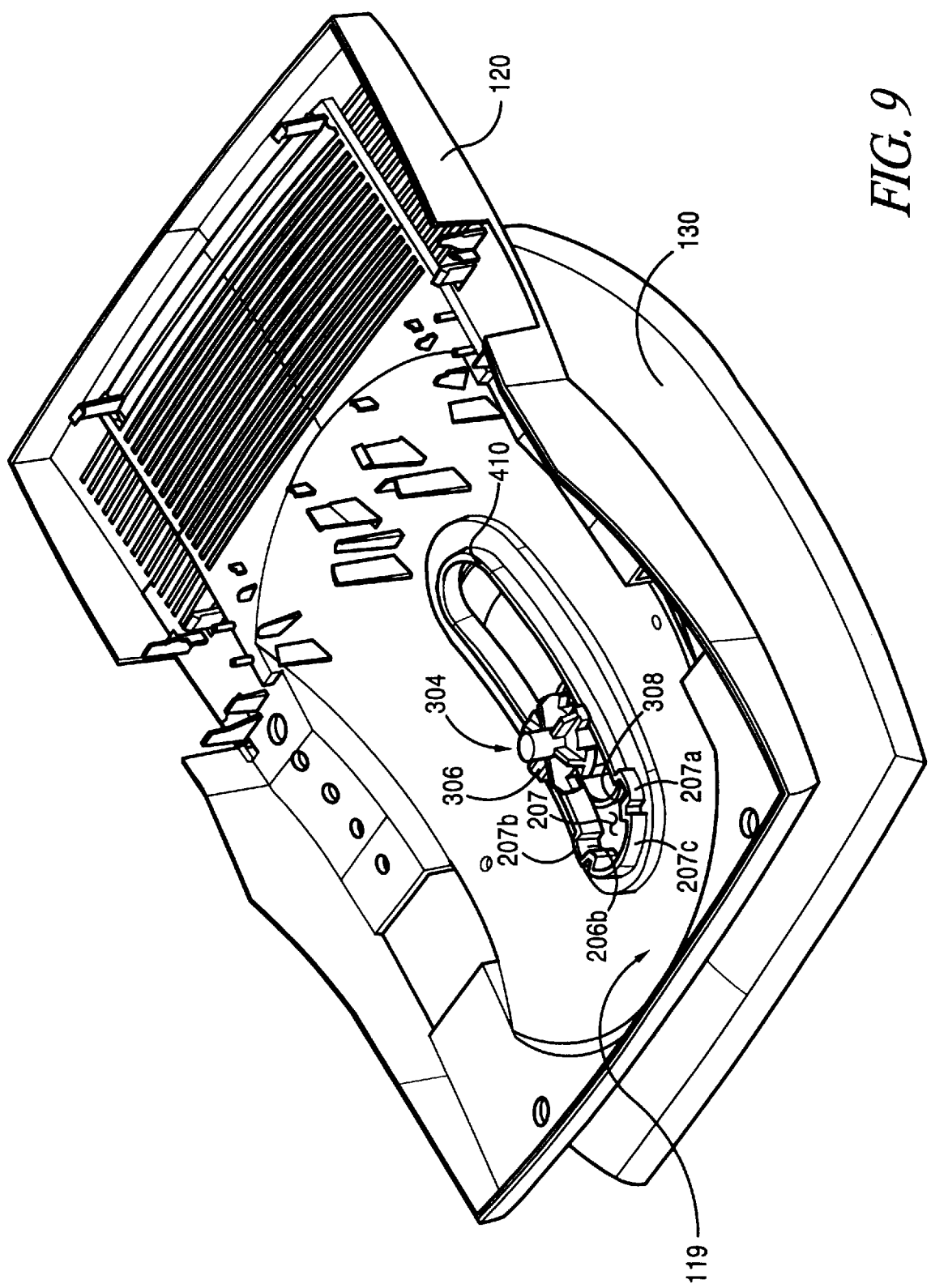
FIG. 9 is a perspective view of the base in the locked position with the support turned 90° from FIG. 7.

FIG. 4 is a perspective view illustrating a top surface 119 of the tiltball 120 positioned above support 130 prior to assembly. The embodiment shown is preferably aligned for assembly when spherical surface 202 is parallel to spherical surface 302, key opening 207 is coaxial to keyed post 304 with features 306 aligning to wing 206a, wing 206b and crown 206c, and locking rib 210 is aligned with locking snap 312. More specifically, the locking rib 210 has to be directly aligned with the rim stop 309. While maintaining this alignment, tiltball 120 and support 130 are brought together until keyed post 304 passes through key opening 207, as illustrated in FIG. 5. Referring again to FIG. 4, a raised ledge 410 of preferably less than 0.25 inches follows the periphery of slot opening 206 on the top of recessed ledge 208. The raised ledge 410 comprises a ledge crown 207c and a pair of ledge wings 207a and 207b such that the ledge crown 207c and the ledge wings 207a and 207b circumscribe the recessed crown 206c and the recessed wings 206a and 206b. Raised ledge 410 is designed to capture features 306, as illustrated in FIGS. 7 and 9.

FIG. 5 is a perspective view illustrating keyed post 304 operatively engaged through key opening 207. That is, features 306 of keyed post 304 include a first tooth 306a designed to complement and pass through wing 206a, a second tooth 306b designed to complement and pass through wing 206b, third and fourth teeth 306c and 306d designed to complement and pass through crown 206c, and fifth and sixth teeth 306e and 306f designed to pass through slot 206. As illustrated, it will be appreciated that features 306 cannot pass through the portion of recessed ledge 208 away from key opening 207.

Figure 6:
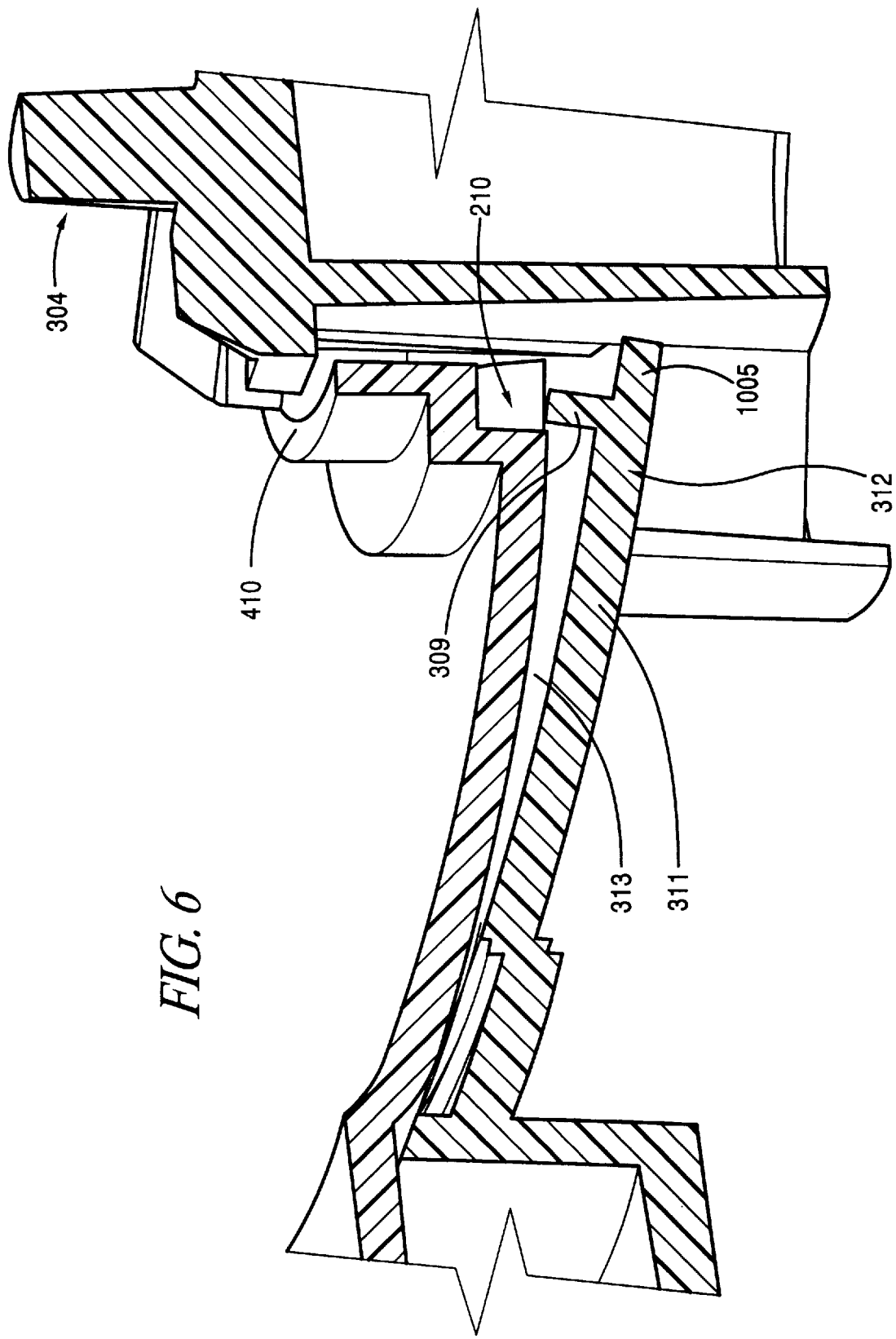
FIG. 6 is a cross-sectional side view illustrating engagement of the locking rib of FIG. 2 with the locking snap of FIG. 3 in its unlocked position.

FIG. 6 is a cross-sectional side view illustrating engagement of locking rib 210 to locking snap 312 with locking snap 312 in the "unlocked position." Namely, as tiltball 120 is moved in the aligned direction into support 130, spherical surface 202 mates with spherical surface 302. Accordingly, locking rib 210 depresses locking snap 312 substantially the full height of locking rib 210. Thus, in this embodiment, shaft 314 must be short enough so that tooth features 306 do not pass raised ledge 410 until locking rib 210 depresses the rim stop 309 of the locking snap 312.

Figure 7:
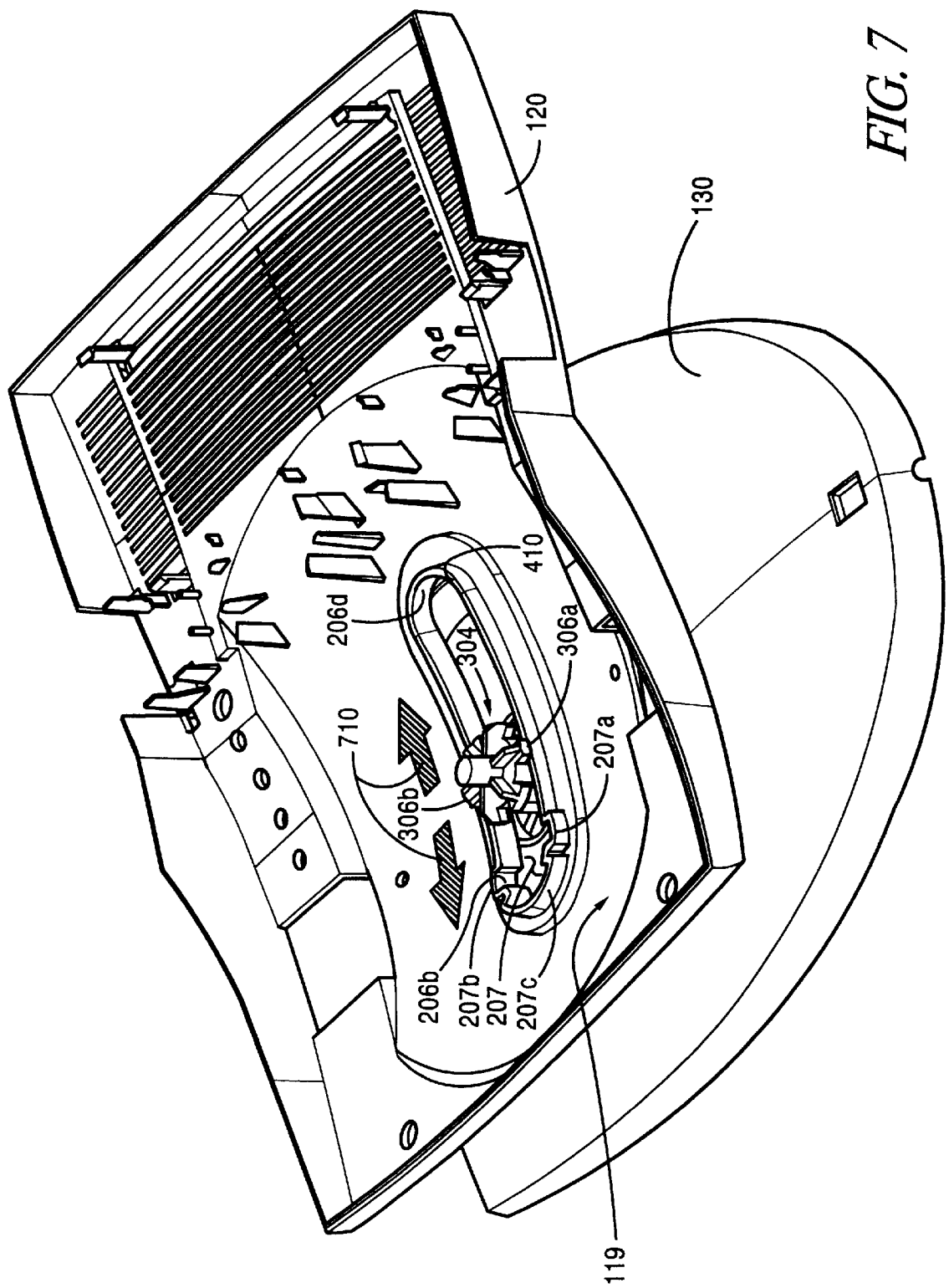
FIG. 7 is a perspective view of the FIG. 4 tiltball and support operatively engaged.

FIG. 7 is a perspective view of tiltball 120 operatively engaged with support 130. Once tiltball 120 and support 130 have been moved into the unlocked position as in FIG. 6, tiltball 120 is tilted so that keyed post 304 slides in slot opening 206 from key opening 207 towards tail 206d. Keyed post 304 tooth features 306 are captured above raised ledge 410 and prevent tiltball 120 from disengaging from support 130. Further, when slot opening 206 is slid a predetermined distance to move key opening 207 away from keyed post 304, locking rib 210 slides off locking snap 312, thereby locking tiltball 120 to support 130. This is referred to as the "locked position" of locking snap 312, which is described in more detail with reference to FIG. 8.

As illustrated by arrows 710 in FIG. 7, slot opening 206 can slide on keyed post 304 between key opening 207 and tail 206d. Because of the relationship between spherical surface 202 and spherical surface 302, sliding tilts tiltball 120 relative to support 130. In this embodiment, as keyed post 304 approaches tail 206d, tail 206d lowers relative to key opening 207. Conversely, as keyed post 304 approaches key opening 207, tail 206d rises relative to key opening 207. Further, although not shown, recessed ledge 208 slides around locking rim 308. Since locking rim 308 has a diameter preferably almost equal to the width W2 of recessed ledge 208, locking rim 308 constrains tiltball 120 from wobbling on support 130.

Figure 8:
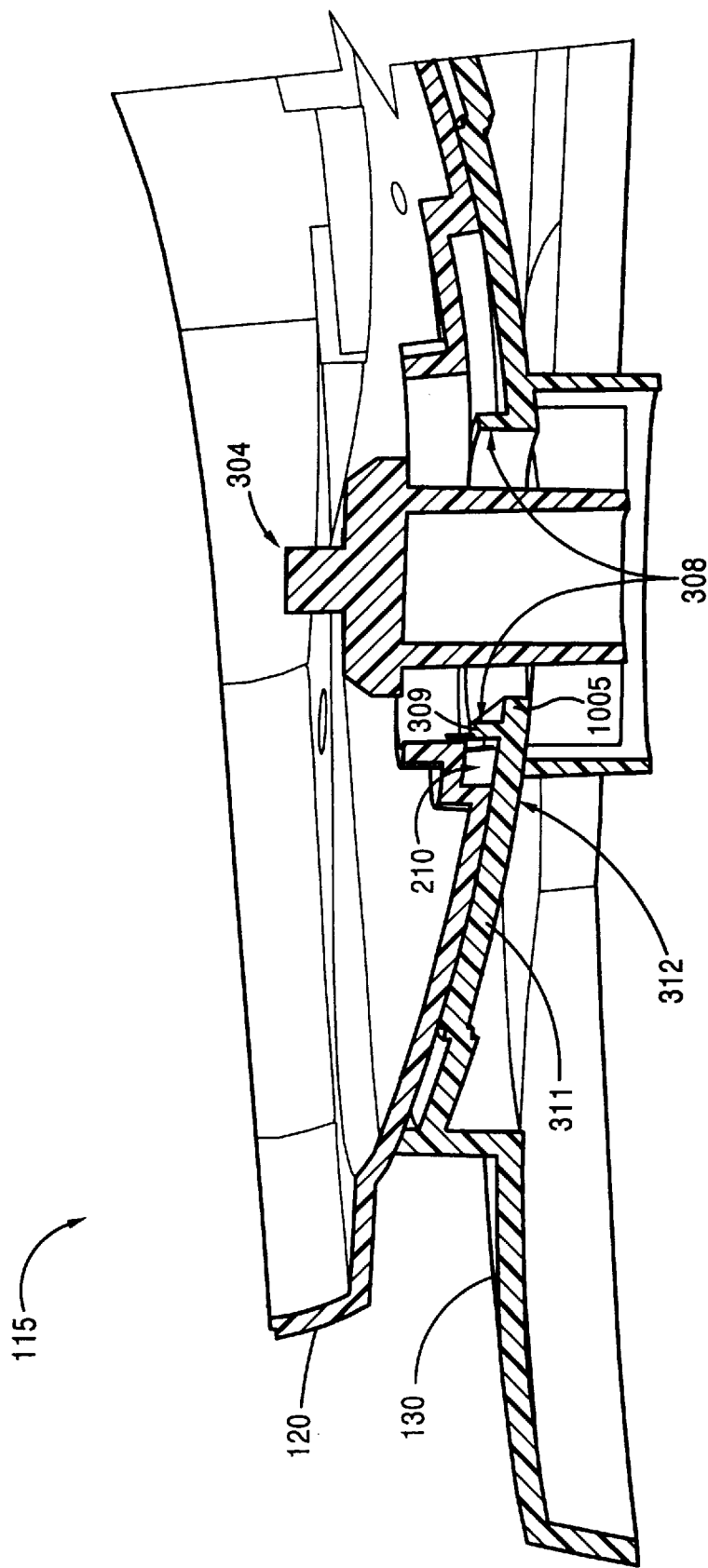
FIG. 8 is a cross-sectional side view of the FIG. 6 rib and snap in the locked position.

FIG. 8 is a cross-sectional side view of base 115 having locking snap 312 in its locked position. After tiltball 120 is slid a distance at least equal to the length of locking rib 210, locking snap 312 rebounds to its original position and restores locking rim 308 to being a substantially continuous ring. In other words, rim stop 309 rebounds back to its initial position, lodging within the rim opening 307. If keyed post 304 is slid back toward key opening 207, then the rim stop 309 of the locking rim 308 abuts locking rib 210 and prevents keyed post 304 from being re-aligned with key opening 207. Thus, while locking snap 312 is in its original position, tiltball 120 cannot be removed from support 130.

FIG. 9 is a perspective view of base 115 in a locked and rotated position. Because of the relationship between spherical surface 202 and spherical surface 302, tiltball 120 can be rotated or panned relative to support 130. Compared to FIG. 7, tiltball 120 has been rotated 90 degrees clockwise relative to support 130 in FIG. 9. Because locking rim 308 (with locking snap 312 in its locked position) is relatively circular, locking rim 308 prevents keyed post 304 from aligning with key opening 207 regardless of its rotational orientation. To prevent tiltball 120 from becoming disengaged from support 130, features 306 are preferably configured so that at least one feature 306 is always blocked by each side of raised ledge 410. In this embodiment, features 306 include six overhanging teeth 306a–306f which are sufficiently close and opposite to one another so that a significant portion of at least one tooth always contacts each side of raised ledge 410. Thus, during rotation, tiltball 120 will not be disengaged inadvertently from support 130.

Figure 10:
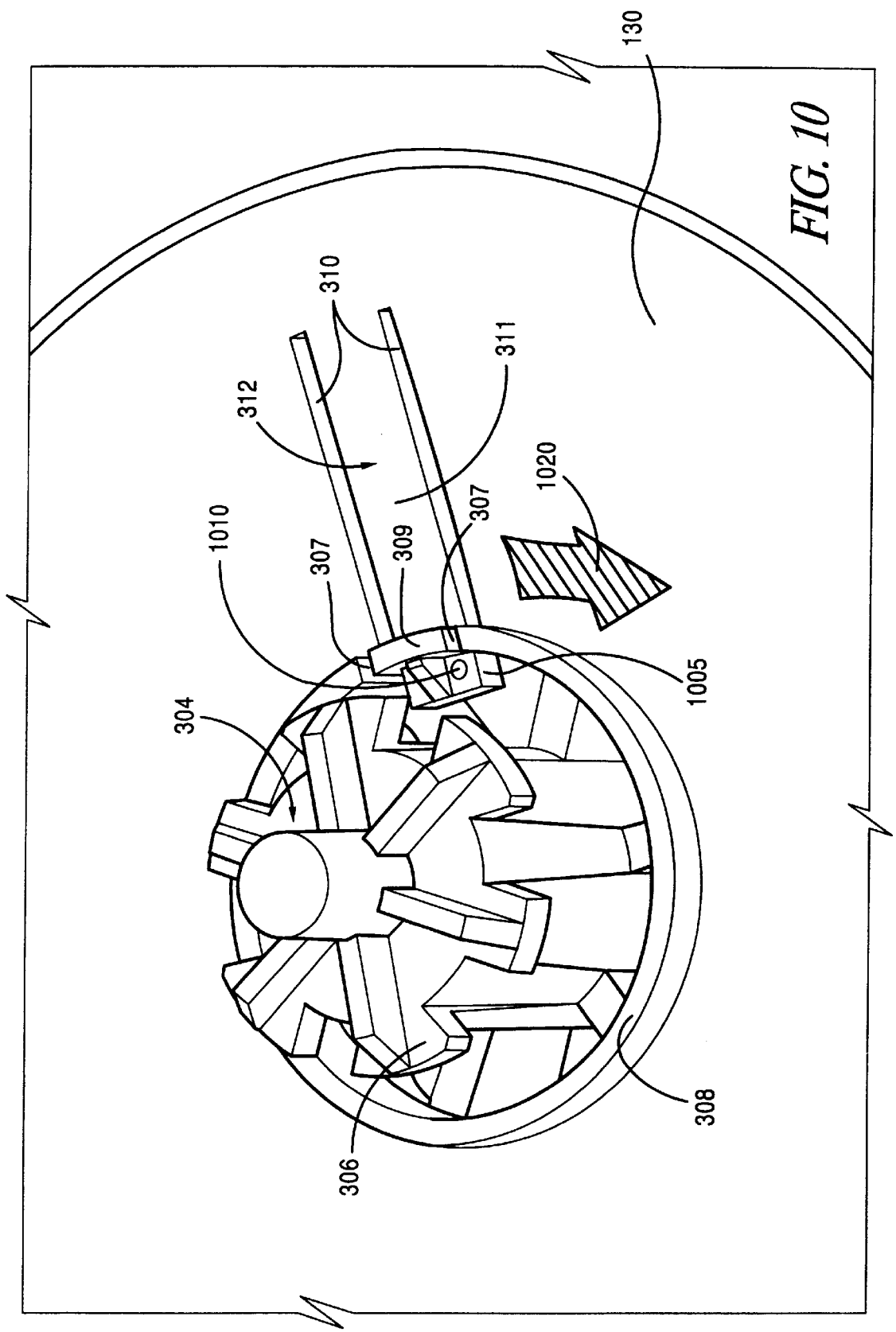
FIG. 10 is a perspective view illustrating disassembly details of the locking snap of FIG. 3.

FIG. 10 is a perspective view illustrating disassembly details of locking snap 312. Locking snap 312 includes the extension 1005 which overhangs past locking rim 308 and has a disassembly hole 1010. A special tool (1200, FIG. 12) fits into disassembly hole 1010 and enables a user to urge locking snap 312 in the direction of the arrow 1020 to its unlocked position. When the locking snap 312 is in its unlocked position, the rim stop 309 is removed from the rim opening 307 of the locking rim 308.

Figure 11:
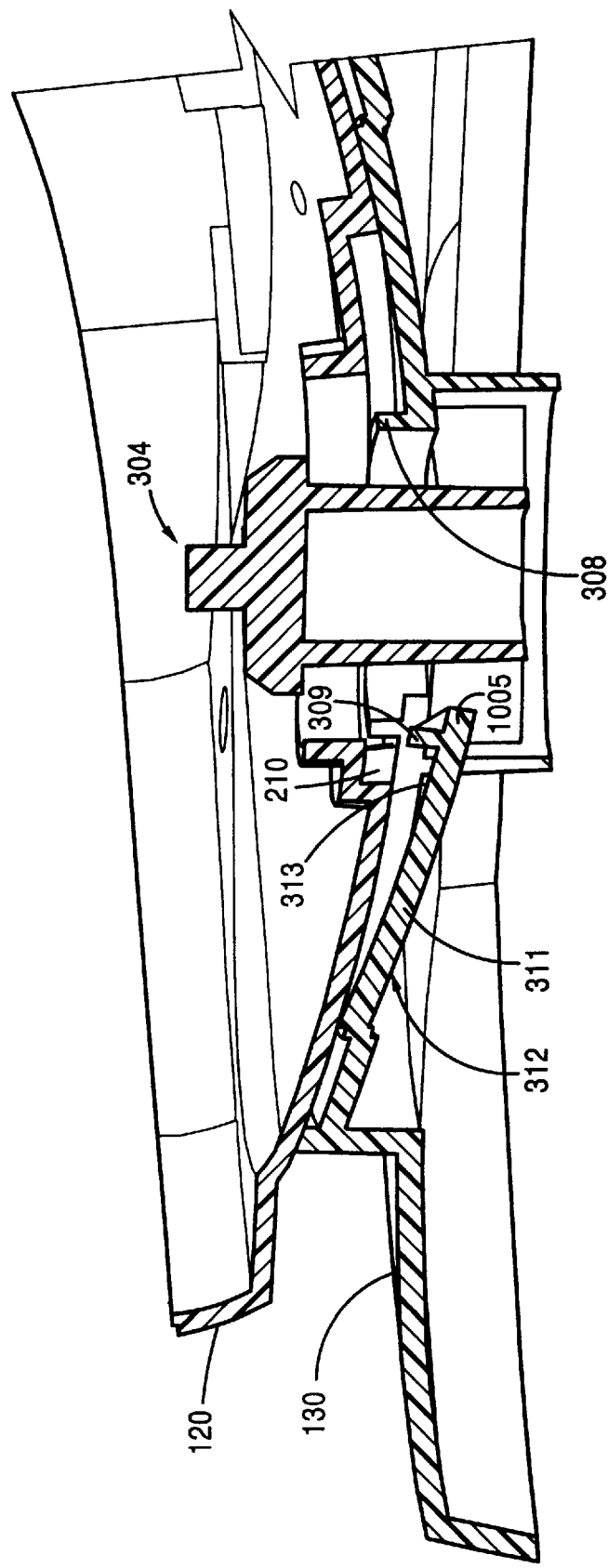
FIG. 11 is a cross-sectional side view of the locking snap of FIG. 3 urged to an unlocked position.

FIG. 11 is a cross-sectional side view of locking snap 312 in its unlocked position. This is achieved by placing special tool 1200 (FIG. 12) into disassembly hole 1010 and urging locking snap 312 in the direction of arrow 1105 to its unlocked position. Thus, the rim opening 307 enables locking rib 210 to lodge within the locking rim 208 as illustrated in FIGS. 5 and 6. With locking snap 312 unlocked, tiltball 120 is rotated to align locking rib 210 with the rim opening 307 and keyed post 304 is slid back to key opening 207. Accordingly, keyed post 304 can be disengaged from key opening 207.

Figure 12:
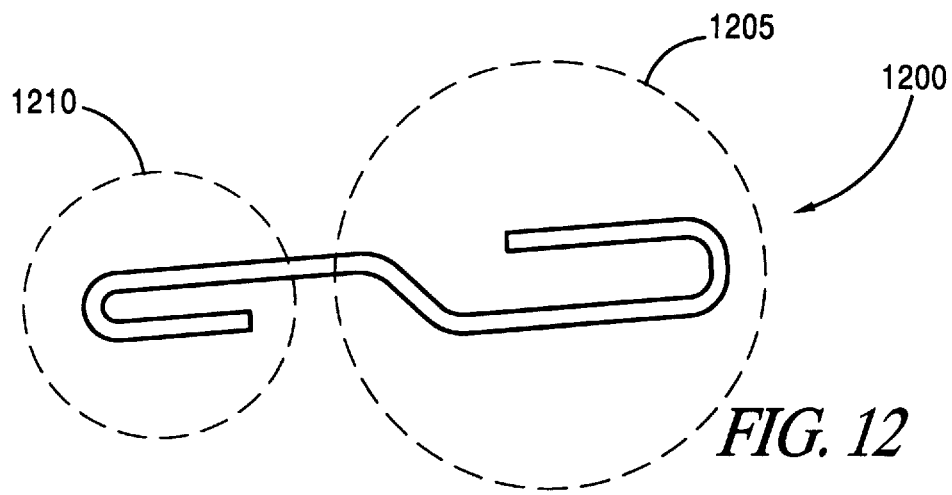
FIG. 12 is a top view of the special tool used for urging the locking snap of FIG. 3 to an unlocked position.

FIG. 12 is a top view illustrating an example special tool 1200 for urging locking snap 312 to the unlocked position. Special tool 1200 includes an elongated grasping member 1205 which can be inserted alongside post 304, and a hook portion 1210 which can be slideably inserted into disassembly hole 1010. Special tool 1200 may be formed from a conventional paper clip by pivoting the opposing sides of the clip about its connecting arc until the sides achieve an almost linear relationship.

Figure 13:
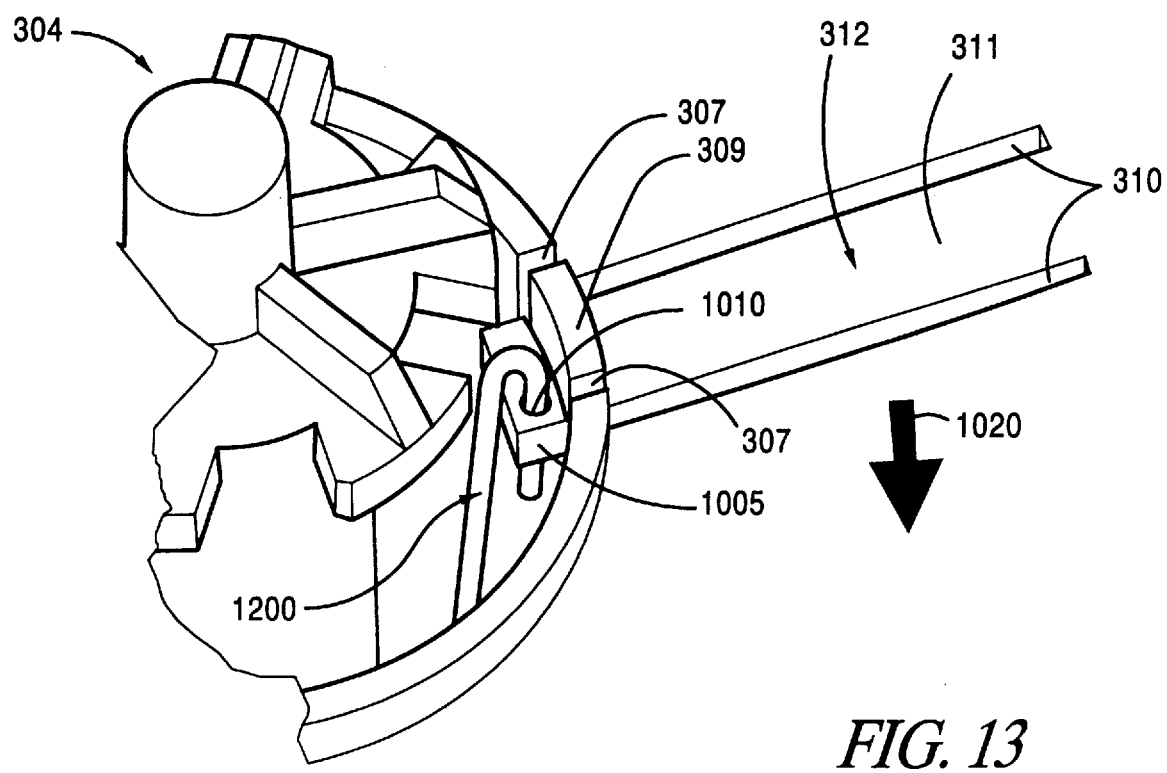
FIG. 13 is a perspective view of the special tool of FIG. 12 operatively engaged in the disassembly hole of the locking snap of FIG. 3.

FIG. 13 is perspective view of special tool 1200 operatively engaged in disassembly hole 1010 of locking snap 312. After inserting hook portion 1210 into disassembly hole 1010, a user can pull elongated grasping member 1205 in the direction indicated by arrow 1020, thereby pulling locking snap 312 to the unlocked position.

The foregoing description of the preferred embodiment of the invention is by way of example only, and variations of the abovedescribed embodiment are provided by the present invention. For example, although keyed post 304 is described as having features 306 which slide above a raised ledge 410, keyed post 304 can be designed to have features which slide in a recessed slot within slot opening 206. The embodiment described herein has been presented for purposes of illustration and is not intended to be exhaustive or limiting. Many variations and modifications are possible in light of the foregoing teaching. The system is limited only by the following claims.

What is claimed is:

1. A tilting, swiveling, locking base apparatus comprising:
 a) a tiltball unit having a top surface and a bottom surface;
  a slot opening disposed in said tiltball unit and having a key opening portion communicating therewith;
  a raised ledge disposed on said top surface and circumscribing the slot opening;
  a recessed ledge disposed on said bottom surface and circumscribing the slot opening; and
  a locking rib connected to the recessed ledge and disposed about the key opening portion; and
 b) a support unit having support points lying in a plane and including a shaft extending in a direction substantially perpendicular from the plane to an outer end;
  teeth on the outer end of the shaft configured to fit through the slot opening only in the key opening portion;
  a locking rim configured to slidably engage the recessed ledge and to allow swiveling of the tiltball unit relative to the support unit equal to and greater than 360 degrees in a horizontal plane; and
  an elastic locking snap comprising a rim stop connected thereto and an overhanging portion secured to said elastic locking snap such that the locking rib is capable of contacting and deflecting the elastic locking snap when the teeth are inserted into the key opening portion and the locking snap rebounds when the shaft is displaced in the slot opening from the locking rib.

2. The base apparatus of claim 1 wherein the tiltball unit is configured to support a monitor.

3. The base apparatus of claim 1 wherein the tiltball unit includes a substantially convex surface.

4. The base apparatus of claim 3 wherein the support unit includes a substantially concave surface having a radius of curvature substantially equal to the radius of curvature of the substantially convex surface.

5. The base apparatus of claim 1 wherein the key opening portion includes a recessed crown and a pair of recessed wings.

6. The base apparatus of claim 5 wherein the teeth include a pair of wing-shaped nubs configured to fit through the pair of recessed wings.

7. The base apparatus of claim 1 wherein the locking snap is defined by a pair of substantially parallel slits through an arc portion of the locking rim.

8. The base apparatus of claim 1 wherein the overhanging portion defines a disassembly hole for receiving a special tool for urging the locking snap to an unlocked position.

9. The base apparatus of claim 1 wherein the locking snap rebounds when the tiltball unit is engaged to the support unit and has been moved a predetermined distance away from the key opening portion.

10. The base apparatus of claim 1 wherein the slot opening is oblong.

11. The apparatus of claim 1 wherein the raised ledge comprises a ledge crown and a pair of ledge wings such that said ledge crown and said ledge wings circumscribe the recessed crown and the recessed wings.

12. A monitor base apparatus comprising:
 a) a support unit for removably receiving a tiltball unit;
 b) a locking snap engaged to said support unit for removably locking said tiltball unit to said support unit;
 c) a rim stop connected to said locking snap for preventing said tiltball unit from disengaging from said support unit and for allowing swiveling of the tiltball unit relative to the support unit equal to and greater than 360 degrees in a horizontal plane; and
 d) an overhanging lip extending from said locking snap for allowing a user to disengage said support unit from said tiltball unit.

13. The apparatus of claim 12 additionally comprising a locking rim having a locking rim opening wherein said rim stop removably lodges.

14. The apparatus of claim 12 additionally comprising a shaft having a plurality of teeth disposed thereto.

15. The apparatus of claim 13 additionally comprising a shaft having a plurality of teeth disposed thereto.

16. The apparatus of claim 12 wherein said support unit includes a spherical surface having a base opening and said locking snap comprises a deflectable tab integrally bound to said spherical surface and lodging in said base opening.

17. The apparatus of claim 15 wherein said support unit includes a spherical surface having a base opening and said locking snap comprises a deflectable tab integrally bound to said spherical surface and lodging in said base opening.

18. The apparatus of claim 12 wherein said overhanging lip comprises a disassembly hole for receiving a special tool for urging said locking snap to an unlocked position to facilitate disengaging of said support unit from said tiltball unit.

19. The apparatus of claim 12 wherein said tiltball unit comprises a slot opening having a key opening portion communicating thereto; a recessed ledge circumscribing said slot opening and capable of slidably receiving said locking rim; and a locking rib disposed on said recessed ledge.

20. The apparatus of claim 19 wherein said key opening portion is defined by a recessed crown and a pair of recessed wings.

21. The apparatus of claim 19 wherein said tiltball unit includes a raised ledge for capturing said teeth when the tiltball unit is engaged to the support unit.

22. The apparatus of claim 17 wherein said tiltball unit comprises a slot opening having a key opening portion communicating thereto; a recessed ledge circumscribing said slot opening and capable of slidably receiving said locking rim; and a locking rib disposed on said recessed ledge.

23. The apparatus of claim 12 wherein said overhanging lip extends from said locking snap beyond said rim stop.

* * * * *